Aug. 1, 1961  G. W. BANKS  2,994,343
METERING VALVE
Filed Dec. 26, 1956
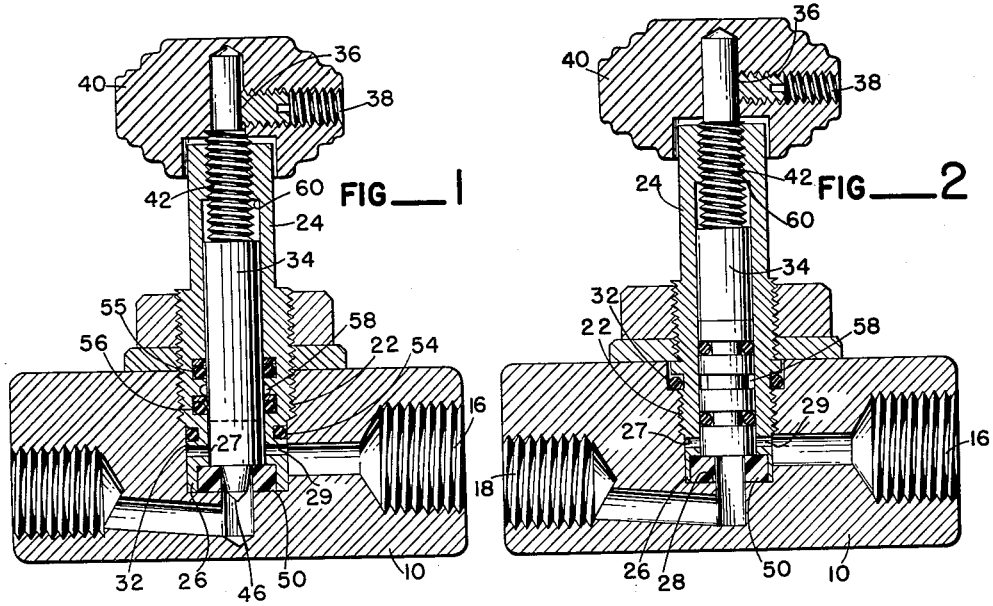
FIG. 1
FIG. 2
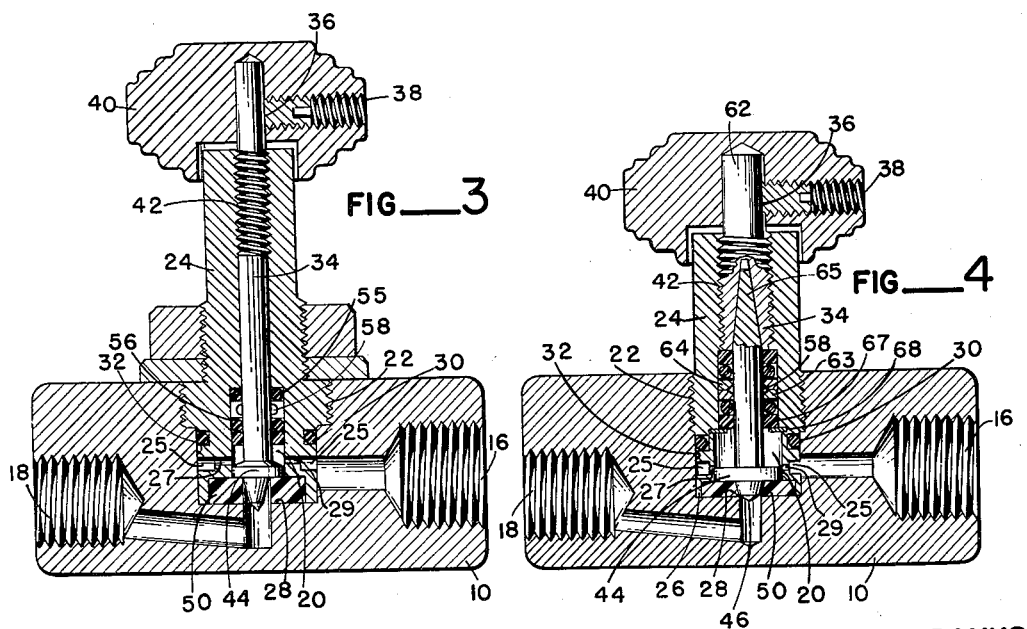
FIG. 3
FIG. 4
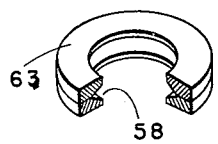
FIG. 5
GEORGE W. BANKS
INVENTOR.
BY
Smith & Tuck

United States Patent Office 2,994,343
Patented Aug. 1, 1961

2,994,343
METERING VALVE
George W. Banks, 12424 14th South, Seattle, Wash.
Filed Dec. 26, 1956, Ser. No. 630,694
1 Claim. (Cl. 137—454.5)

This present invention relates to the general art of valves intended to give very fine control of fluids under pressure. More particularly, this present invention relates to metering valves designed to operate at relatively high pressures of the order of 6000 pounds per square inch and covering a temperature range of −100° to +500° F.

In order to give the minute metering characteristics so essential in a valve that is adapted to handle small flows at very high pressures, it is necessary that the entire valve be made of parts which are particularly well suited for mutual coaction. In this present valve the various structural features are each balanced against each other, to the end that the valve will function to control fluids at all pressures within the indicated range, with a very smooth action, and the essential operating force can be applied with the thumb and the tip of one finger. Because of the smoothness of operation which the present association of parts provides, it is possible to give very minute control of the flow of fluids through the valve and thus obviate the possibility of a large surge of gas or liquid when the valve is opened. The most valuable and delicate instruments are thus safeguarded against damage.

The principal object of this present invention, therefore, is to provide a plurality of coacting parts making up a fluid valve, which will smoothly and with little applied effort control the flow of high pressure fluids throughout a wide range of temperatures.

A further object of this present invention is to provide a metering valve so constructed that there is no danger of over-torqueing the valve stem and consequently it is impossible to damage the metering needle or the shut-off seat.

A further object of this invention is to provide a metering valve in which maximum use is made of currently highly developed plastic materials in order to provide a positive non-leaking shutoff and at the same time provide against any leakage between the various parts of the valve, and especially along the valve stem.

A further object of this invention is to provide a metering valve in which the metering and shutoff elements are all contained within the removable valve stem assembly, to the end that minimum servicing time will be required for the valve without disturbing the connected tubing, and in which the plastic shutoff valve seat may be easily extracted from its confining metal seat by a continued turning action of the valve stem.

A further object is to provide a removable valve stem assembly which is provided with a structure adequate to safely contain the high pressures, for which service my valves are intended.

Further objects, advantages and capabilities will be apparent from the description and disclosure in the drawings, or may be comprehended or are inherent in the device.

In the drawings:

FIGURE 1 is a vertical sectional view of one form of my present metering valve.

FIGURE 2 is a vertical sectional view showing a modified form of the valve of FIGURE 1.

FIGURE 3 is a vertical sectional view showing a modified form of my valve, but which form embodies many of the desirable characteristics of the form shown in FIGURE 2.

FIGURE 4 is a vertical sectional view showing an additional modified form of the spindle assembly of my valve and also the construction used to accommodate my valve to uses where panel mounting is not intended.

FIGURE 5 is a perspective view, partly in section, showing a preferred form of lubricant washer as used in my valve.

Referring more particularly to the disclosure in the drawings, the numeral 10 designates the body portion of my valve. This body portion may be likened to the chassis of an automobile, for instance, inasmuch as all the various parts are secured directly or indirectly to this body. As indicated in the drawings, body 10 is provided with threaded pipe connections. These may accept heavy duty pipe with a small interior diameter, or they may accept the standard tubing fittings that are presently well developed and generally well known in this line of equipment. Throughout the drawings I have preferred to illustrate my invention by showing the type of valve in most general use, namely, the globe and three port types. However, with minor rearrangement of the pipe-receiving bosses with their sockets, the same principles and the same structure, with minor modifications, are equally useful in angle valves and three port valves. Each pipe- or tubing-receiving socket is provided with an inwardly directed passageway as 16 and 18, respectively, which communicates through certain apertures with the valve chamber 20.

Disposed concentrically of chamber 20 is the threaded bore 22. This bore accepts the threaded end of spindle barrel 24, which is threaded into the same until the barrel end 26 abuts the machined-out portion 28 of body 10. At the same time the spindle barrel seal 30 is engaged by the cylindrical guide bore 32 formed as a guide for the spindle barrel. This seal, which is preferably an O-ring, insures against leakage along the threads of bore 22, the annular groove 25 and ports 27 and 29.

Axially disposed within spindle barrel 24 is the spindle assembly 34. Spindle 34 is flattened at 36 so that a set screw 38 may lock handle 40 against angular movement around spindle 34 and thus provide a means for turning the spindle. Spindle 34 is threaded adjacent its upper end as at 42 to operatively engage the spindle barrel 24, which is likewise provided with a coacting interior thread. The body of spindle 34 is cylindrical in most forms down to its end or for certain uses, to the cylindrical, enlarged diameter valve shutoff surface 44. Exteriorly of surface 44 is the metering point or needle 46.

One of the basic concepts in my valve is that the internal workings of the valve, namely, the stem assembly including the stem barrel and the seating washer, can all be removed from valve body 10 for servicing even at a point considerably remote from the tubing or piping into which the body 10 may be assembled. It is with this thought in mind that the spindle barrel 24 has a downwardly extending skirt ending in the bottom-engaging surface 26, which normally limits the downward movement of the barrel when the valve is being assembled. This skirting encloses the periphery of the seating washer 50 so that, as the valve barrel and spindle assembly may be unscrewed as by threads 22, the washer 50, the skirting that encloses it frictionally engages and positions it, and the valve chamber 20 are all removed as a single assembly. The washer body is fully engaged and supported on its bottom surface by valve body 10 and on its upper surface the outer portion is always fully engaged by the lower surface of the spindle barrel inside of the skirting. The inner portion of the upper washer surface is fully engaged by the lower surface of the valve spindle when in the closed position. Thus washer 50 is fully enclosed and supported everywhere except the axial bore when the valve is closed, and fluid pressure at its peak. This bore is under full fluid pressure but as the plastic washer 50 is fully enclosed and supported everywhere else the washer does not become distorted or damaged by the very high pressure fluids which the valve is designed to control. Washer 50 is preferably formed of a plastic which has the facility to flow or yield slightly under high pressure of the order of 4000 to 6000 pounds per square inch. A typical plastic of this order is sold under the name of "Teflon," having the technical name of polytetrafluoroethylene.

One preferred form of my valve is shown in FIGURE 1, and in this arrangement an O-ring is employed at 54. This O-ring seats within a groove cut in the outer surface of the spindle barrel and makes engagement with the cylindrical bore 32 formed in body 10. Normally one packing ring of this order is enough to seal threads 22 against leakage where they engage the interior threads of body 10.

Because of the very substantial pressures encountered with these valves, certain types of them are arranged to accept working pressures as high as 6000 pounds per square inch. When pressures of this magnitude are being encountered, then leakage becomes a very important problem, and one point of leakage that must be very definitely provided against is along the valve stem or spindle 34. Experience has shown that, if two O-rings as 55 and 56 are employed, they will hold pressure, provided they are at all times kept in good condition. As a conditioning means I provide a groove as 58, which may be filled with a suitable lubricant periodically and is disposed between the two O-rings 55 and 56, so that the two O-rings act in a mutually supporting manner and will always be in condition to accept the high pressures imposed on them. By having the spindle assembly easily removed from the valve body, of course this lubrication can be easily inspected and the lubricant renewed as needed.

It is to be noted that the various spindles 34 are all provided with a threaded portion at their upper ends, and these threads normally are fine threads in order to give the required fineness of adjustment for the valves. This in turn weakens the closure to a degree at this point, in that the finer the threads the less thrust they can accept. As a matter of safety, then, it is preferred that the spindle diameter be enlarged below the threads. This may be immediately below, as shown in FIGURES 1 and 2, or it may be down near the valve ring 44, as illustrated in FIGURES 3 and 4, for instance. When this precaution is observed, any excess in pressure or failure of materials, which would tend to permit the valve spindle to be blown out of the valve, will be resisted by the abutting of the spindle against a solid shoulder 60 in the spindle barrel. This member can readily accept heavier pressures, because the threads as 22 are normally of adequate length and size and on a sufficient diameter to give them strength for any excess of any possible pressure.

In FIGURE 4 I have illustrated a modified form of my valve spindle and have made it in two parts, an upper portion 62 and a lower portion 64. These two members are joined together by a tapered portion where one member has a male portion and the other a female portion of a taper, as illustrated at 65. A suitable taper to be used is that employed on taper pins, which corresponds normally to ¼ inch per foot, or .0208 inch per inch. In this figure is illustrated a preferred form of the two-piece lubricant washer 63 which provides a groove 58 which serves as a reservoir for lubricant. Disposed below the spaced O-rings and washer 63 is a Teflon guide 67. A snap ring 68 to hold the obturating assembly in place is desirable.

This construction makes it possible to use very small diameter O-rings and to change the internal structure of the relief or lubrication grooves between the rings or the number of the rings themselves. This construction has a number of other conveniences that will probably be quite well understood by persons versed in this field.

It is desired to bring out that, while different forms or species of this invention are shown, they all have much in common, and the principal reason for modification in structure is to reduce the manufacturing costs of the valves as the pressure or temperature range requirements are less exacting. It is to be noted, however, that all the different forms have a valve spindle which is mechanically held against being blown out of the spindle barrel in case of failure of the small threaded adjusting portion of the spindle. Next a very definite high pressure seal is provided around the stem and one which will seal high pressures without undue friction, to the end that the valve can be easily manipulated normally with just the pressure that can be conveniently exerted by the thumb and forefinger.

A further common structure of the different forms is that a skirting is provided which is either formed as part of the spindle barrel or is readily retractable with the spindle assembly, and that this skirting positions the plastic washer 50 and assists in its removal. The skirting also has in it communicating openings, together with an annular communicating groove, to the end that these pieces can be easily and economically manufactured and can be easily inspected for wear and easily replaced when necessary.

A further common characteristic of the various forms of this invention is that, when the spindle barrel is retracted from the valve body, the washer 50 can be expelled from the assembly by merely continuing to screw outwardly on the spindle and it will move the washer out of the skirting so that it can then be conveniently removed from the needle portion 40.

It is believed that it will be clearly apparent from the above description and the disclosure in the drawings that the invention comprehends a novel construction of metering valve.

Having thus disclosed the invention, I claim:

A high pressure metering valve for fluids comprising a metal body having means for connecting a plurality of pipes thereto, said body being formed with a first cylindrical bore terminating in a bottom interiorly of said body, a second smaller bore coaxial with said first bore extending into said body from the bottom of said first bore, a first passageway communicating between one of said pipe connecting means and said first bore at a level above the bottom of said first bore, a second passageway communicating between a second pipe connecting means and said second bore at a point below the bottom of said first bore, a spindle barrel threadedly secured to said body at the upper end of said first bore in axial alignment therewith, the lower end of said spindle barrel being formed to define a skirting which outlines a circular recess with the lower end of said skirting positioned against the bottom of said first bore, a valve spindle axially disposed with respect to said spindle barrel and having threads adjacent its outer end engaged with coacting threads in said spindle barrel, sealing means for said valve spindle adjacent the valve end of said spindle, a pierced valve washer snugly received within said skirting with its lower face in contact with the bottom of said first bore, the exterior of the lower end of said spindle being closely fitted to the interior of the upper portion of said skirting to limit flow therebetween, a valve member disposed at the lower end of said spindle, said valve member being narrower than said spindle and extending into the opening in said washer so that when said spindle is forced to its lowermost position, flow of liquid between said valve member and said washer will be stopped by contact therebetween, the mating surfaces of the exterior of said skirting and the interior of said first bore defining an annular groove at a level communicating with said first passageway, orifice means defined by said spindle barrel communicating between said annular groove and the interior of said spindle barrel above said skirt to enable regulated flow when said spindle is elevated above said skirt to the level of said openings.

References Cited in the file of this patent

UNITED STATES PATENTS

| | | |
|---|---|---|
| 2,187,733 | Juhasz | Jan. 23, 1940 |
| 2,583,291 | Beem | Jan. 22, 1952 |
| 2,634,087 | Hess | Apr. 7, 1953 |
| 2,645,449 | Gulick | July 14, 1953 |
| 2,692,750 | Davis | Oct. 26, 1954 |
| 2,703,584 | Mix | Mar. 8, 1955 |
| 2,757,897 | Cline | Aug. 7, 1956 |